Nov. 9, 1926. Re. 16,460

R. D. EDWARDS

MOTOR BELT

Original Filed Sept. 2, 1922

INVENTOR
Robert D. Edwards.
BY Arthur C. Brown
ATTORNEY.

Reissued Nov. 9, 1926.

Re. 16,460

UNITED STATES PATENT OFFICE.

ROBERT D. EDWARDS, OF KANSAS CITY, MISSOURI.

MOTOR BELT.

Original No. 1,474,666, dated November 20, 1923, Serial No. 585,992, filed September 2, 1922. Application for reissue filed December 20, 1923. Serial No. 681,891.

This invention relates to motor belts and particularly to fan belts for transmitting power from an explosion motor to a fan designed to distribute air over the motor.

The primary object of the invention is to provide a novel form of belt constructed from a single piece of fabric such as canvas, or duck, the canvas being initially cut in a strip, the ends of which are fastened together to form an endless band. The belt is folded over upon itself laterally in a plurality of plies preferably of progressively decreasing widths from the periphery toward the center, the folds being fastened together by lines of stitching so that a complete belt is provided.

The novel construction of the belt will be apparent by reference to the following description in connection with the accompanying drawings, in which—

In carrying out the invention I first provide a relatively wide strip 1 and cut the ends at acute angles so that the ends can be fastened together by a bias seam 2.

Figure 1:
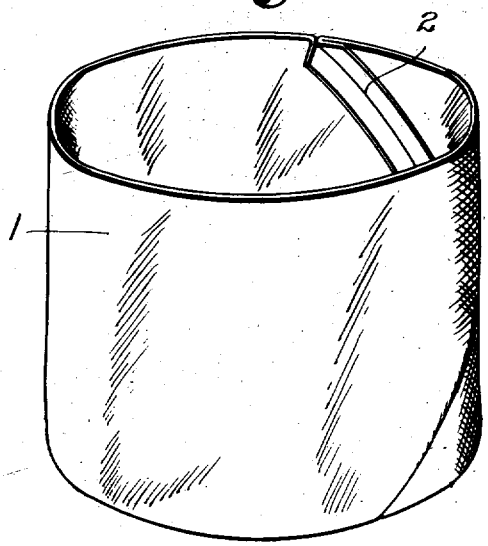
Fig. 1 is a perspective view of a single, relatively wide strip having its ends fastened together to provide the band.
Figure 5:
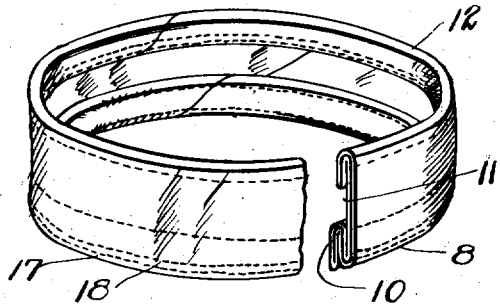
Fig. 5 is a perspective view of the belt folded to provide the fifth step.
Figure 3:
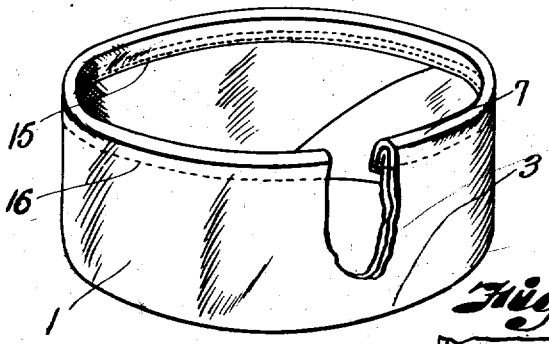
Fig. 3 is a perspective view showing the third step in forming the belt.

After the band is thus formed, as shown in Fig. 1, it is folded laterally with the folded edge 3 midway its longitudinal center, the free edges 4 and 5 being fastened together by a line of stitching 6. Then the free edges which have just been stitched are turned over to form a relatively narrow hem 7, as shown in Fig. 3. The folded over edge portion 3 is then folded over on the main portion of the belt in a lateral direction to make a fold 8, the initially folded over edge 3 lying adjacent to the edge of the hem 7. The folded-over lap 9 formed by making the fold 8 is then folded back toward one edge of the band to make a fold at the point designated 10 in Fig. 5 so that there is a folded portion with six plies and a hem portion with four plies, there being a space 11 between them.

Figure 6:
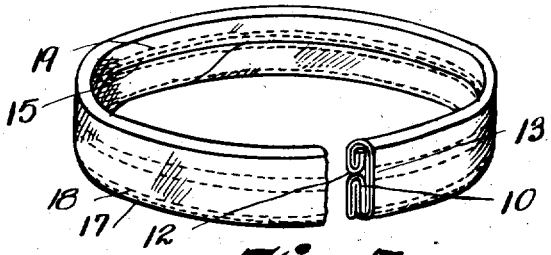
Fig. 6 is a perspective view of the belt structure folded to provide the sixth step.
Figure 7:
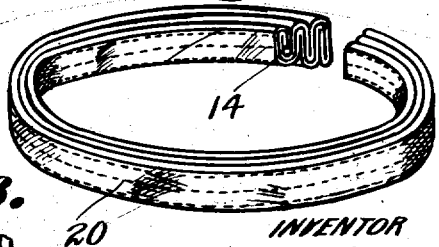
Fig. 7 is a perspective view of the completed belt.
Figure 8:
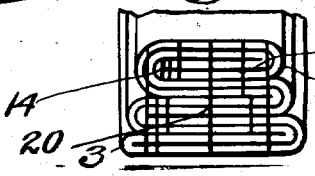
Fig. 8 is an enlarged, cross sectional view through the completed belt.

The hem portion is then folded over on the band so that its outer edge 12 will lie against the inner edge of the fold 10, as indicated in Fig. 6. Then the belt is folded at the point 13, so that the hem is on the inside of the belt, and stitched; the belt then being arranged, as shown in Fig. 7. Fig. 7 indicates the complete belt consisting of a plurality of back and forth folds or plies of progressively decreasing widths from the periphery to the inner face of the belt, the hem being folded in between certain of the folds, as indicated at 14 (Fig. 8).

Figure 4:
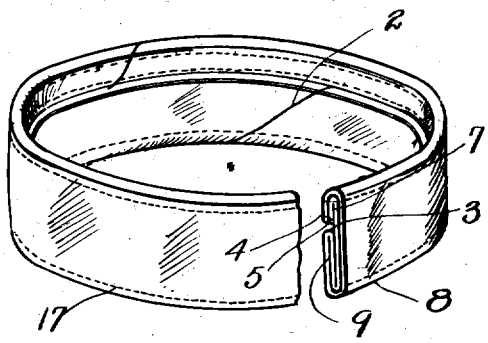
Fig. 4 is a perspective view showing the fourth step in forming the belt.
Figure 2:
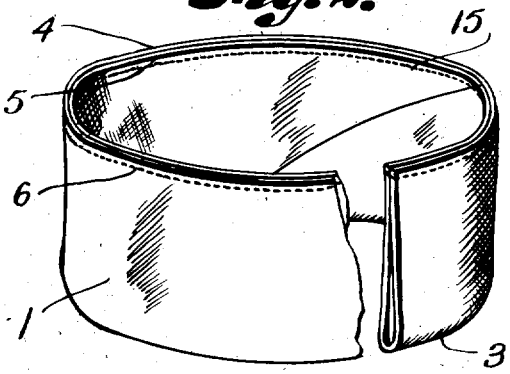
Fig. 2 is a perspective view showing the next step in forming the belt.

The strip is first connected together, of course, by a line of stitching and the hem shown in Fig. 2 is formed by a line of stitching. The two edges are then fastened together by a line of stitching 15; the hem is held in place by another line of stitching 16, the folded-over portion shown in Fig. 4 is again stitched to the belt by a line of stitching 17, and then when the lapped-over portion is folded back upon itself, it is secured by a further line of stitching 18. Then the hemmed-over portion is folded over, as shown in Fig. 6, secured to the body portion of the belt by a line of stitching 19 and finally, when the folds are caused to assume the position shown in Fig. 7 and before the belt is turned, an additional line of stitching 20 fastens them all together.

Such a built-up belt made from a single strip of fabric folded back and forth laterally upon itself will provide a belt of considerable strength and great endurance, the belt being substantially V-shaped in cross section so that it can be readily received in the grooved pulley on the fan shaft and a grooved pulley on the motor shaft.

In actual practice I have demonstrated that such a belt besides having endurance and wearing qualities will have no appreciable stretch after a considerable period of use.

Other fabrics than canvas or duck may be employed if desired, but I recommend canvas or duck as the material best suited for the purpose.

What I claim is:

1. As a new article of manufacture, a motor belt, consisting of a single strip of flexible material secured at its ends to provide a band, the band being folded along its longitudinal center to provide two plies, the free edges of the two plies being turned over to provide a narrow hem fold, the first folded edge being turned over so as to lie adjacent the hem fold, the fold thus made being reversibly folded, the hem portion being folded back upon the remainder of the band, the hemmed portion being reversibly folded upon the first mentioned portion, and the plies being stitched one upon the other as a result of the several folds.

2. As a new article of manufacture, a motor belt, consisting of a single strip of flexible material secured at its ends to provide a band, the band being folded along its longitudinal center to provide two plies, the free edges of the two plies being turned over to provide a narrow hem, the first folded edge being turned over so as to lie adjacent to the hem, the fold thus made being reversibly folded, the hem portion being folded back upon the remainder of the band, the hemmed portion being reversibly folded upon the first mentioned portion, the plies being held together to make the completed belt.

In testimony whereof I affix my signature.

ROBERT D. EDWARDS.